United States Patent [19]

Greever et al.

[11] Patent Number: 4,589,198
[45] Date of Patent: May 20, 1986

[54] TUBE LOADING APPARATUS

[75] Inventors: James E. Greever, Dewitt; Kenneth P. Gray, East Syracuse, both of N.Y.

[73] Assignee: Carrier Corporation, Syracuse, N.Y.

[21] Appl. No.: 749,972

[22] Filed: Jul. 1, 1985

Related U.S. Application Data

[62] Division of Ser. No. 564,608, Dec. 22, 1983, Pat. No. 4,547,952.

[51] Int. Cl.$^4$ .............................................. B23P 11/02
[52] U.S. Cl. ................................. 29/709; 29/157.3 R; 29/727; 29/799; 29/809
[58] Field of Search .................. 29/157.3 R, 451, 525, 29/709, 726, 727, 799, 809; 53/475, 246, 594

[56] References Cited

U.S. PATENT DOCUMENTS 3,535,764  10/1970  Hoffman ........................... 29/809 X
4,228,573  10/1980  Barnard ........................... 29/157.3 R Primary Examiner—Howard N. Goldberg
Assistant Examiner—Timothy V. Eley
Attorney, Agent, or Firm—Thomas J. Wall

[57] ABSTRACT

Apparatus for automatically loading a series of hairpin tubes into a magazine that is used to temporarily store the tubes so that they can be later laced into a fin pack. The magazine contains individual open-ended compartments for receiving and storing the tubes therein. The compartments are indexed into a loading station having a ram for driving hairpins into the indexed compartment. A gripping mechanism is also located in the loading station having fingers that engage the extended legs of the hairpin and guide the legs into the magazine compartment.

7 Claims, 4 Drawing Figures

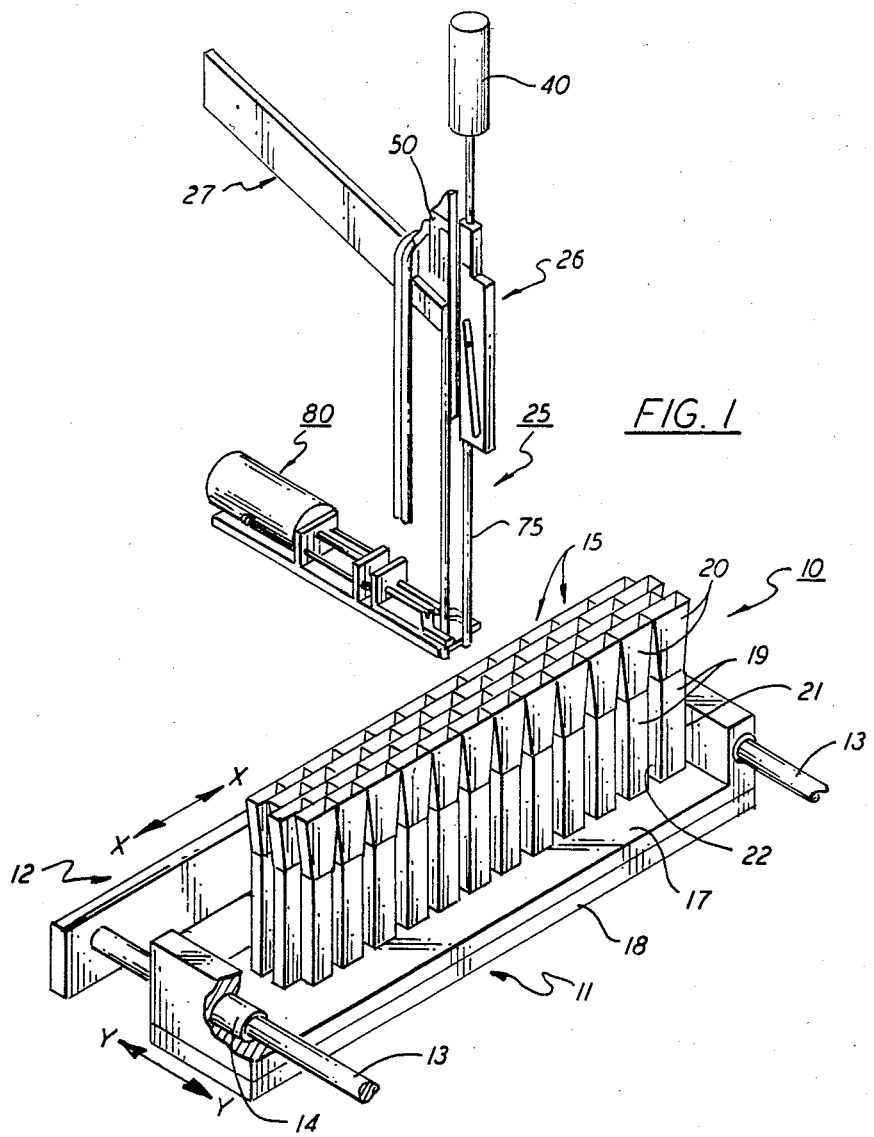
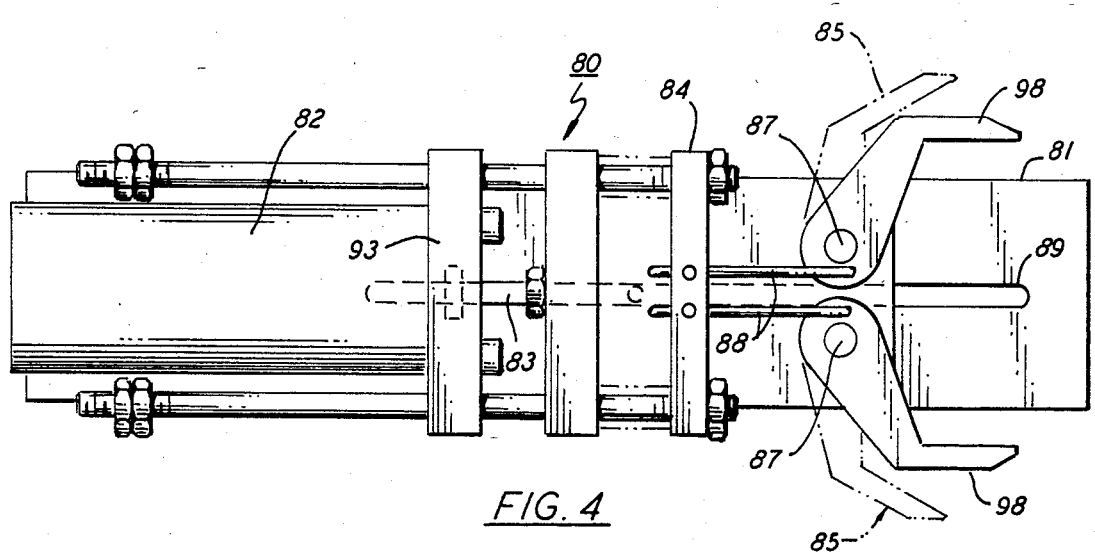

TUBE LOADING APPARATUS

This application is a division of application Ser. No. 564,608, filed Dec. 22, 1983, now U.S. Pat. No. 4,547,952.

BACKGROUND OF THE INVENTION

This invention relates to fin pack heat exchangers and, in particular, to apparatus for facilitating the hairpin tubes into a fin pack unit.

As disclosed in the U.S. Pat. Nos. 4,195,540; 4,285,256 and 4,286,486, machines have recently been developed for automatically stacking prestamped plate fins into packs of the type used in heat exchanges for refrigeration systems or automotive cooling systems. The plate-like fins are stamped from sheet material and the fins are brought to an endless conveyor for stacking. The conveyor includes a series of laterally disposed blocks having elongated spikes or mandrels capable of passing through tube receiving holes formed in each of the plates. The plates are loaded upon the mandrels one over the other to form a vertical column defining a fin pack unit. The units are assembled on an upper horizontal reach of the conveyor and are removed at the end of the reach as the stacking blocks swing into a horizontal position during the return portion of the conveying cycle.

The assembled fin pack units, upon being removed from the stacking machine may be passed on to an automatic assembling machine wherein the end baffels or "tube sheets" are registered over the top and bottom of each stack and hairpin tubes then laced through the assembly. The term hairpin tube, as herein used, refers to a U-shaped tubular member having two equally elongated legs that are in general parallel alignment. When the hairpin tubes are laced into a thin pack assembly, each leg forms a flow channel that is perpendicular to the fins. The legs of adjacent hairpins are later interconnected by means of tube bends to complete the flow circuit through the fin pack unit. The open ends of the hairpins are generally belled and the tube bends inserted into the bell openings and soldered in place to provide a fluid tight joint. Prior to inserting the tube bends into the bells, the hairpin tubes are also expanded into locking contact against the fins by passing an expanding rod through the tube legs. An automatic machine for lacing hairpins into assembled fin pack units is described in U.S. Pat. No. 4,228,573 which issued to Barnard.

Although automatic machines have been devised for performing many of the tasks involved in the manufacture of fin pack coils. Typically each hairpin is formed of an aluminum based material that is cold worked into a U-like configuration. The two legs of the U-bend are relatively long and as a consequence, the alignment between the tube ends varies dramatically between hairpins. With the center distance between the two legs being typically wider than the center distance between the tube holes formed in the fin pack units. Inserting the hairpins into the pack thus poses a very special problem. In the above noted Barnard machine, the fin packs are laid upon their sides and the hairpins are inserted horizontally into the receiving holes. To align the tubes with the holes, the hairpins are laid in a row in a side by side relationship within a special fixture immediately adjacent to the fin pack unit. An entire row of hairpins is then pushed into the fin pack. The horizontal loading and lacing of the hairpins in this manner is time consuming, requires a good deal of space and raises very special handling problems involving both aligning the tube ends positively with the fin pack holes. Laying the individual tubes into the holding fixture is ordinarily performed by hand and this subject to human error. If the hairpins are not accurately aligned within the fixture the tubes will hang up during the insertion process.

SUMMARY OF THE INVENTION

It is therefore an object of the present invention to improve apparatus for assembling fin pack coils.

A further object of the present invention is to automatically load hairpin tubes into a magazine used to lace the tubes into a fin pack assembly.

A still further object of the present invention is to eliminate alignment problems associated with lacing hairpin tubes into fin pack coils.

Another object of the present invention is to conform the end of hairpin tubes within a loading magazine so as to facilitate efficient lacing of the tubes into the pack.

Yet another object of the present invention is to provide a loading mechanism for firing hairpins into a loading magazine so that the ends of the hairpin tubes do not hang up as they enter the magazine compartments.

These and other objects of the present invention are attained by means of apparatus for loading hairpin tubes into a magazine having a series of open-ended compartments for storing the tubes in a condition wherein the tubes can be laced into a fin pack unit. Each compartment is indexed into a tube loading station where a hairpin is ejected legs first into the open end of the compartment. A gripping mechanism is located in the loading station having coacting fingers that move against the extended legs of a tube in the loading postion and close the legs sufficiently to allow the tube to freely enter the magazine compartment indexed thereunder. Simultaneously therewith an extendable ram is actuated which drives the constrained tube downwardly into the compartment. A control device is provided to regulate the transfer of tubes from a conveyor into the loading station.

BRIEF DESCRIPTION OF THE DRAWINGS

For a better understanding of these and further objects of the present invention, reference is had to the following detailed description of the invention which is to be read in conjunction with the accompanying drawings, wherein:

FIG. 1 is a perspective view of apparatus embodying the teachings of the present invention;

FIG. 4 is an enlarged plan view of a gripping mechanism for aligning the legs of a hairpin which is positioned in that loading station to insure that the legs of all ejected hairpins pass freely into the magazine.

DESCRIPTION OF THE INVENTION

Figure 2:
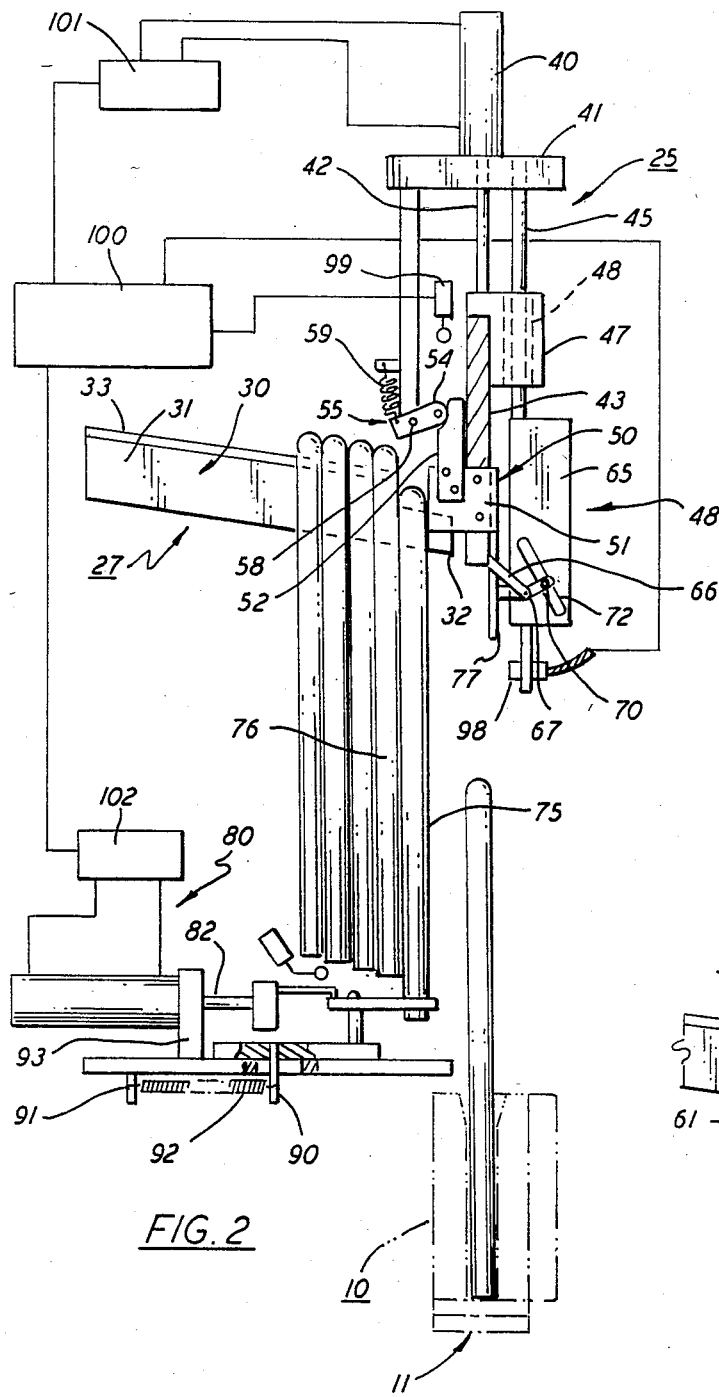
Fig. 2 is an enlarged side elevation of the tube loading station employed in the present apparatus further showing a ram for ejecting tubes into a loading magazine.

Referring now to the drawings wherein like numbers represent like parts, there is shown apparatus for automatically ejecting hairpin tubes into a loading magazine used to lace tubes into fin pack coils. As best seen in FIG. 1, the magazine, generally referenced 10, is shown mounted upon an indexing mechanism that includes a platform 11 which is slidably contained within a carriage 12. The carriage is connected by suitable linkage to an indexing mechanism (not shown) so that the carriage can be accurately located along the x—x axis as indicated by the arrows. The platform 11 is similarly mounted between rails 13—13 upon linear bearings 14 so that the platform can be positioned inside the carriage along the Y—Y axis. The magazine is made up of a series of individual open ended compartments 15 that are aligned in rows upon the platform 11. Although four rows of compartments are shown in the FIG. 1, it should be understood that both the number of rows and the number of compartments in each row can be varied depending on the number of tubes required. It should also be noted that the spacing and orientation of the individual compartments may also be varied to accommodate the tube geometry of the fin pack without departing from the teachings of the present invention.

The platform of the indexing mechanism includes a base plate 17 having openings formed herein into which the individual compartments are passed to support the compartments in parallel vertical alignment as shown. A gate 18 is slidably mounted against the bottom surface of the base plate which can be moved to selectively open and close the compartments. When the gate is closed, a floor is placed under each compartment that prevents a hairpin introduced therein from passing through the magazine. Moving the slide to an open position frees the captured hairpins and permits them to be pushed through the compartment. In practice, upon loading the magazine, the carriage is moved to a lacing station (not shown) where the tubes stored in the magazine are inserted into a fin pack unit.

Each compartment includes a rectangular shaped elongated body section 19 having a funnel shaped entrance 20 joined thereto. The opposed parallel sidewalls 21 and 22 of each compartment serve to retain the legs of a retainer hairpin in parallel alignment and to guide the legs of the tube into receiving holes formed in the fin packs during the insertion process. The width of each compartment body is slightly greater than the outside diameter of the hairpin tubes so that the tubes nest snugly in the magazine without binding.

Positioned immediately above the magazine in the present apparatus is a tube loading station generally depicted at 25 from which individual hairpin tubes are ejected into the nesting compartments of the magazine. The tubes are fed one at a time into a tube loader 26 via a conveyor 27. The conveyor, in practice, is an inclined blade 30 having two levels; an upper level 31 and a lower level 32. The hairpins straddle the blade with the legs thereof hanging downwardly in a generally vertical direction. The top edge 33 of the blade is brought to a knife-edge so that the hairpins slide under the influence of gravity down the blade towards the loader.

As illustrated in FIG. 2, a vertically disposed double acting cylinder 40 is contained in a stationary frame 41 over the conveyor 27. An extendable piston rod 42 connected to the cylinder passes through the frame and is coupled to a ram 43 so as to drive the ram in a vertical direction. A vertical post 45 is anchored in the frame 41 which also extends downwardly therefrom in parallel alignment with the piston rod 42. A bearing block 47 is slidably retained on the post by means of linear bearing assembly 48. The bearing block is secured by a strap to the piston rod just above the ram and serves to guide the rod along a linear path of travel. A housing 49 is affixed to the bottom of the post 45, the purpose of which will be explained in greater detail below.

A bracket assembly 50 is attached to the ram by means or screws of the like so that the assembly is caused to move with the ram as it reciprocates in a vertical plane. The bracket assembly includes a release block 51 that is arranged to pass downwardly adjacent to the lower section 32 of the conveyor blade when the ram is extended as shown in FIG. 2. A cam 52 is secured to the release block and extends upwardly therefrom. The cam contacts a cam follower 54 mounter on an escapement 55. The escapement is rotatably secured in a standard 57 by means of a pivot pin 58 and is biased toward the cam by means of spring 59.

The working profile of the cam is described by its front vertical wall 61 and a contoured seat 62 against which the cam follower rides as the cam is driven by the ram over a vertical path of travel.

Returning once again to housing 49, there is rotatably mounted in one sidewall 65 thereof a tube hanger 66. The hanger is pivotally supported in the wall by a pivot pin 67 and is biased for rotation in a clockwise direction by means of a spring 69 extending between a vertically disposed trunnion 70 and the bottom wall of the housing. The trunnion is staked in the hanger and rides in an inclined slot 72 formed in the sidewall 65 of the housing. The trunnion is normally bottomed in the slotted hole with the hanger suspended beneath the ram. The hanger passes through a guide plate 77 and is capable of being rotated into the guide plate as the ram is extended.

Figure 3:
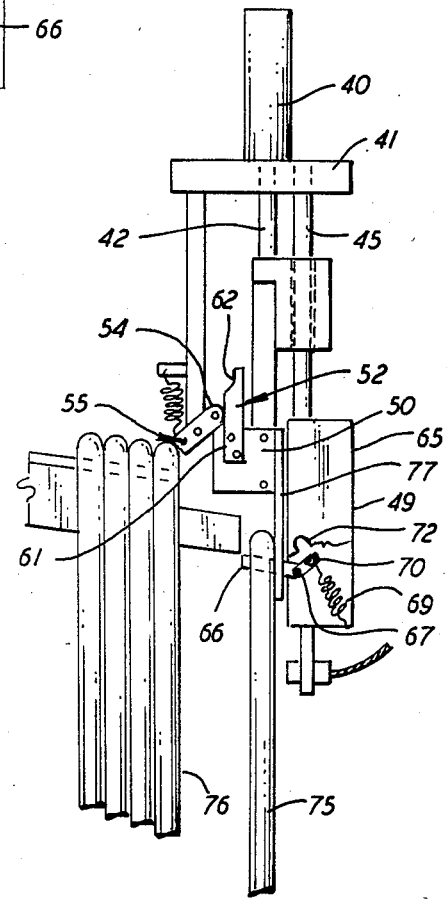
FIG. 3 is a partial side elevation of the ram illustrated in FIG. 2 showing the ram in a retracted position and a tube being retained upon a hanger preparatory to being ejected into the magazine.

Initially, with the ram in a fully extended position as shown in FIG. 2, the release block 50 is positioned adjacent to the lower section 32 of the conveyor. At this time, the cam follower of the escapement 55 is resting in the contoured seat of the cam. The escapement is thus pulled back allowing the first tube 75 on the conveyor to drop down to the lower section thereof where it is held by the release block in a standby position. Retracting the ram pulls the release block out of the way and tube 75 is permitted to move down the lower section of the conveyor onto the extended hanger 66. The guide plate 77 hangs down from the release block and helps to align the tube on the hanger in a generally vertical position. The biasing spring of the hanger has sufficient strength to hold the hanger in an extended position as shown in FIG. 3 against the weight of an individual tube suspended thereon. Raising the release block serves to close the escapement via cam 52 into a tube blocking position wherein the second tube 76 in line is prevented from dropping down into the standby position. This insures that the retracted ram will have free access to the tube position on the hanger to eject it on the return stroke.

As previously noted, the geometry of hairpin tubes coming from a bending machine will vary greatly because of the nature of the bending operation and also the characteristics of the tube material. Accordingly, inserting the ends of the hairpin tubes into the magazine compartments presents a problem. A gripping mechanism 80 is herein provided to contact the ends of the tube conveyed into the loading mechanism and bring them into a posture that will enable them to be ejected effectively into the magazine. As illustrated in FIG. 4, the gripping mechanism involves a base plate 81 for supporting a horizontally aligned double acting cylinder 82 having an extendable piston rod 83 arranged to drive a block 84. A pair of quick acting fingers 85—85 are supported beneath the block upon a slide 86. The fingers are pivotably mounted in the slide by means of pins 87—87. Each finger is connected to the block 84 by means of cylindrical control rods 88—88. A guide way 89 passes through the base and receives guide pins secured to the slide therein. One of the guide pins, pin 90, extends through the base and is connected to an anchor pin 91 via a spring 92 (FIG. 2). Under the influence of the biasing spring, the slide is continually urged back towards the cylinder against a stop 93.

In operation, as the rod 83 is retracted, the slide is brought initially against the stop 93 (FIG. 2) which prevents further rearward movement thereof. However, the block 84 will continue its rearward motion for some period of time after the stop is engaged. This lost motion causes the control rods to rotate each of the fingers into a fully opened position as shown in FIG. 4. On the forward stroke of the piston, the rod initially rotates the fingers into a closing position as illustrated by the darker outline 98. The slide is then rapidly advanced to a full forward position to support and align the tube in the loading station.

The gripping mechanism 80, in assembly, is positioned immediately below the loading mechanism 35 and co-acts therewith to insure that each tube is inserted effectively into the magazine. The fingers of the device are located so that they are directly below a tube brought into the standby position when the fingers are fully opened. At the beginning of the cylinder stroke, the fingers are closed against the tube ends forcing the ends inwardly so that the center distance between the two legs is slightly less than the inside dimension of the magazine compartment. Advancing the closed fingers to the end of the forward stroke carries the tube end directly over the compartment that has been indexed into the loading station. This, along with the guide plate 77, aligns the tube in a vertical position so it can be ejected by the ram accurately into the indexed compartment. When the tube is properly aligned, the ram is extended driving the tube into the compartment. The hanger 66 at this time, is pushed back against the biasing action of spring 69 thereby allowing the tube to move along the guide plate 77.

A pair of sensors are provided which are adapted to detect when a hairpin tube is properly aligned in the loading station. A first light sensor 98 is suspended beneath the housing 48 and is arranged to sense the presence of the top section of a hairpin tube in the loading station. An electrical switch sensor 98 is mounted over the gripper mechanism and has an actuator arm which is adapted to cycle the switch when a slide has reached a fully extended position. Both sensors are electrically connected by appropriate lines to a microprocessor controller 100 that is programmed to carry out a sequence of operations needed to feed the tubes sequencially into the loading station in timed relation with the motion of the ram. Initially, the controller receives an input signal at terminal 101 indicating that an empty magazine compartment has been indexed into the loading station. Hydraulic control valves 101 and 102 are then instructed to retract the ram 43 and advance the gripper slide 86 causing the standby tube to be advanced and aligned in the loading station. Retracting the ram closes escapement 55 thus preventing the first tube on the conveyor from moving into a standby position. Raising the ram also trips a second electrical switch 104 which generates a signal indicating that the escapement has closed and a loaded tube is ready to be ejected into the magazine. Upon receipt of this signal, the valves 101 is resequenced thus forcing the ram down into contact with the tube in the loading station. After the tube has cleared the station valve 102 is also resequenced retracting the fingers of the gripper mechanism thereby completing the tube ejecting cycle.

While this invention has been disclosed with specific reference to the details set forth above, it is not confined to those details and the application is intended to cover any modification or changes as may come within the scope of the following claims.

We claim:

1. Apparatus for automatically loading hairpin tubes into a magazine for temporarily storing the hairpin prior to insertion into a fin pack coil, said apparatus including
   a magazine having a series of open-ended, vertically aligned, compartments for storing hairpin tubes therein,
   indexing means for bringing each of said open-ended compartments into a tube loading station,
   conveyor means for feeding a tube into the loading station with the legs of the tube disposed downwardly over the open end of a compartment indexed therein,
   gripping means for biasing the legs of a hairpin in said loading station inwardly so that said legs can freely enter the open end of the said compartment,
   ram means extendable to eject the said hairpin downwardly into the said compartment and
   automatic control means for sequentially activating the gripping means and the ram means to pass a tube in the loading station into the said open-ended compartment.

2. The apparatus of claim 1 that further includes a standby station adjacent to the loading station and a gating means for advancing a tube from the conveyor means to the standby position when the ram is in a fully extended position.

3. The apparatus of claim 2 that further includes an escapement associated with said gating means to prevent a tube from advancing from the conveyor means to the standby station when the ram is retracted.

4. The apparatus of claim 1 wherein said gripping means includes a pair of movable fingers that reconnected to a drive means for moving the fingers between the standby station and the loading station, and a camming means for closing the fingers against the legs of a tube in the standby station and holding the fingers closed when positioned in the loading station.

5. The apparatus of claim 1 that further includes a sensing means positioned adjacent to the loading station for detecting the presence of a tube therein and transmitting an enabling signal to the control means for initiating tube ejecting sequence.

6. The apparatus of claim 1 wherein said magazine includes a movable door slidably mounted beneath the compartments for closing the bottom end of the compartment to prevent ejected tubes from passing there through.

7. The apparatus of claim 1 further includes a guide means for directing a tube ejected from the loading station into an open ended compartment.

* * * * *